United States Patent [19]
Enning et al.

[11] Patent Number: 5,346,275
[45] Date of Patent: Sep. 13, 1994

[54] REAR END OF A VEHICLE BODY

[75] Inventors: Norbert Enning, Denkendorf; Heinrich Timm, Ingolstadt, both of Fed. Rep. of Germany

[73] Assignee: Audi AG, Ingolstadt, Fed. Rep. of Germany

[21] Appl. No.: 30,388

[22] PCT Filed: Nov. 8, 1991

[86] PCT No.: PCT/EP91/02113
§ 371 Date: Mar. 31, 1993
§ 102(e) Date: Mar. 31, 1993

[87] PCT Pub. No.: WO92/11159
PCT Pub. Date: Jul. 9, 1992

[30] Foreign Application Priority Data

Dec. 20, 1990 [DE] Fed. Rep. of Germany ....... 4040978

[51] Int. Cl.$^5$ ............................................. B60R 27/00
[52] U.S. Cl. ................................... 296/195; 296/204; 296/76; 296/189
[58] Field of Search ............... 296/195, 203, 204, 205, 296/76, 188, 189

[56] References Cited

U.S. PATENT DOCUMENTS

| | | | |
|---|---|---|---|
| 1,809,606 | 6/1931 | Strong | 200/106 |
| 1,842,214 | 1/1932 | Sullivan | 296/195 |
| 3,595,335 | 7/1971 | Wessells, III | 296/189 |
| 4,618,163 | 10/1986 | Hasler et al. | 280/785 |
| 4,950,031 | 8/1990 | Mizunaga et al. | 296/195 X |
| 5,011,208 | 4/1991 | Lewallen | 296/76 X |

FOREIGN PATENT DOCUMENTS

| | | |
|---|---|---|
| 0146716 | 7/1988 | European Pat. Off. |
| 0450421 | 11/1927 | Fed. Rep. of Germany |
| 2268680 | 11/1975 | France |
| 2537080 | 3/1984 | France |
| 59-029572 | 2/1984 | Japan |
| 59-227538 | 2/1984 | Japan |
| 1233177 | 12/1989 | Japan |
| 9002680 | 3/1990 | World Int. Prop. O. |

Primary Examiner—Joseph D. Pape
Attorney, Agent, or Firm—Jacques M. Dulin

[57] ABSTRACT

An improved rear end design for a vehicle body including a first, upper cross member and a second, lower cross member fitted one over the other to form a compound beam. Each cross member is preferably formed as an aluminum extrusion. The upper cross member has the same contour shape as the lower edge of the access door for the trunk. The lower cross member lies below the level of the trunk floor and includes a middle region contour having a curve which matches a corresponding overlying middle region of the upper cross member. Each side end of the lower cross member curves forward under the trunk floor and is joined to a corresponding end of a pair of transversely spaced longitudinal side bearer members or impact-absorption units. The invention provides for a stable rear-end construction, particularly at the joints with the rear impact-absorption units, and also forms a support edge for the trunk-access door. The invention also results in less extensive repairs in the event of a rear collision.

20 Claims, 1 Drawing Sheet

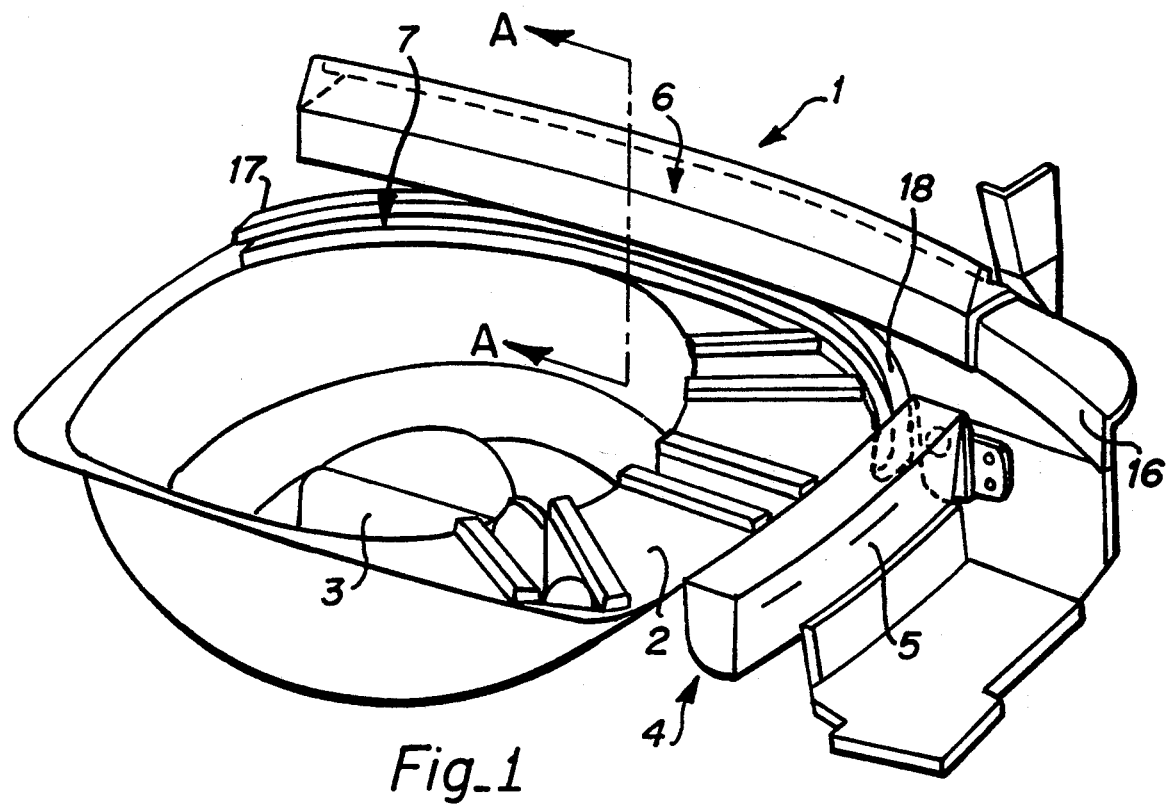
Fig_1
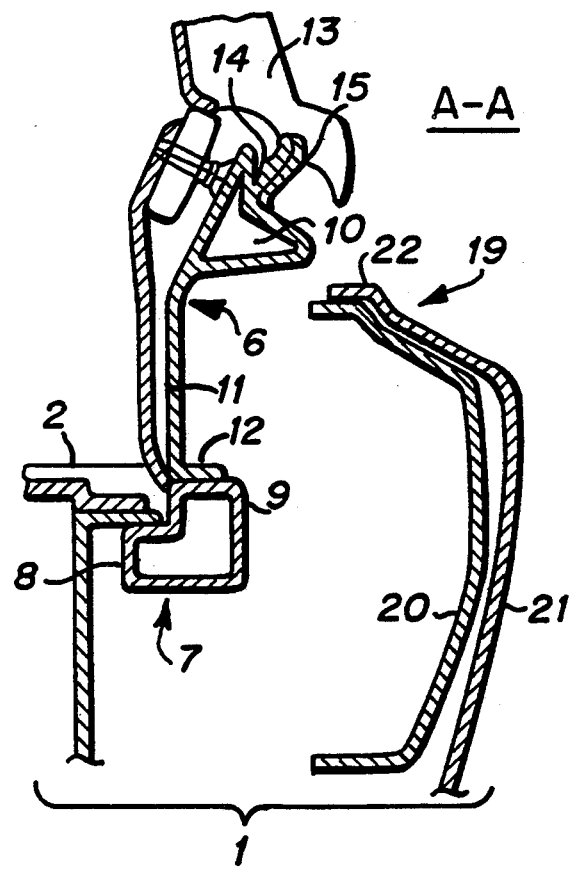
Fig_2

REAR END OF A VEHICLE BODY

FIELD

The present invention relates generally to a vehicle body structure, and more particularly to an improved rear end design of a vehicle body which is both stable and easily repairable.

BACKGROUND

In sheet metal vehicle bodies, the rear end is typically assembled by welding together a number of preformed metal sheets to form a bearing structure having an encasing outer wall. In most instances, a cross member is provided for connection to both the floor of the trunk and to the ends of the longitudinal bearers in the region where they emerge into the rear end portion of the vehicle body.

Such a construction is relatively costly, due to the larger number of sheet metal parts and welding steps required. Furthermore, since the entire interconnected arrangement is usually deformed in the event of a rear collision, repair costs are also expensive and cost-intensive.

In known rear end designs of the type comprising a pair of transverse members including an upper transverse member and a lower transverse member joined together one above the other, and wherein the transverse members each have a constant cross section and the lower transverse member is joined to a trunk floor, a substantial portion of the lower transverse member contour lies above the level of the trunk floor. In addition, the lengthwise members provided on each side of the vehicle terminate in the region in front of the rear wheel housings. Since the rear end is joined by many structural pieces to the wheel housings, side walls, helical springs, etc., the impact energy associated with a commonly occurring rear collision from a sideways direction correspondingly acts on a number of parts, including the load-bearing frame elements. Thus, even a vehicular collision of a relatively low impact energy will cause major damage, thereby resulting in high repair costs for straightening out and replacing the many damaged sheet metal components.

U.S. Pat. No. 1,809,606 discloses a vehicle frame structure wherein two longitudinal members are joined by rivet connections by a middle cross member and a rear cross member. The middle cross member has curved ends, each of which abut on one of the opposing inward facing walls of the two longitudinal members. The rear cross member is straight and is flush mounted at right angles to the rear ends of the longitudinal members.

Other arrangements for the load bearing frame elements of a vehicle space frame are known, such as, for example, from International Publication No. WO 90/02680 (corresponding to International Application No. PCT/NO89/00086), wherein each load bearing longitudinal structural member is formed as an integral extruded multicavity shape which is split, selectively curved, and aligned to merge with secondary complementary shaped members. A portion of each of the multicavity shaped members diverges from the longitudinal direction to form front and rear cross members, however, no compound cross member having means for reducing impact energy is disclosed or suggested.

Repairs are especially problematic for the known vehicle bodies which have space frames assembled from extruded aluminum sections and cast joint elements, an example of which is disclosed in European patent document EP 0 146 716. Such aluminum bodies are extremely long-lived on account of the increased resistance to corrosion as compared to conventional sheet metal bodies. Based on present day accident statistics, it is safe to assume that such long-lived vehicle bodies will likely experience repeated damage with deformations, especially in the rear end, during the average course of its lifetime. Repairs, especially repairs of the aluminum load-bearing frame elements, are particular problematic on account of the known difficulties, such as expensive light metal welds and loss of strength at welded points in the case of multiple welds. Therefore, it is desirable to provide structural solutions which protect against damage caused to the vulnerable collision points of the load-bearing frame elements in a light-metal vehicle body particularly in the event of commonly occurring minor collisions having less serious impact energies.

THE INVENTION

Objects

It is therefore a principle object of the present invention to provide an improved rear end design for a vehicle body comprising a rear compound cross beam member arrangement which provides a stable bearing structure including a lower cross member for support of the trunk floor and an upper cross member having a rearwardly protruding portion disposed adjacent a bumper arrangement such that impact energies are first absorbed by the upper cross member thereby sparing the lower cross member of deformation in the event of a rear impact.

It is another object of the present invention to provide an improved rear end design for a vehicle of the type described which is of simple construction and is less costly to repair in the event of a rear collision.

Other and further objects will become evident from the following drawings, written description and appended claims.

DRAWINGS

The invention is explained with additional details, features, and advantages by means of a sample embodiment in which:

FIG. 1 is a perspective view of part of a rear body of a vehicle; and

FIG. 2 is a section view taken along line A-A and in the direction of arrows of FIG. 1.

SUMMARY

According to the invention, a compound rear cross member assembly comprising an upper and lower cross member is provided for joining together the lengthwise members of the vehicle frame in the region where they extend into and terminate at the rear zone of the vehicle body. The lower cross member is situated beneath the level of the trunk floor and includes a middle portion having a contour which corresponds to an overlying middle contour portion of the upper cross member. The ends of the lower cross member are forwardly curved beneath the trunk floor and are joined to the corresponding longitudinal bearers in abutting fashion. The upper and lower cross members are joined together at their overlying middle contour regions. The connection between the upper and lower cross members creates a stable compound beam.

In this simple compound beam arrangement, the upper cross member of the compound beam travels along the outer edge above the floor of the trunk and forms the supporting edge surface for the trunk-access door. At the same time, the lower cross member provides a suitable bridging connection for joining together the ends of the longitudinal members whereby the curved ends facilitate good force distribution to the longitudinal members. Since the curved ends of the lower cross member travel beneath the floor of the trunk, this arrangement does not affect the desired level trend of the trunk floor.

Also, as each end of the lower cross member is heavily curved forward, the lower cross member is the last portion of the compound beam to deformed, if at all, in a side angle rear collision. With a suitable arrangement of the bumper, only the upper cross member will suffer damage in a rear impact of lesser severity, thus allowing for easy replacement of only the upper cross member during repairs. The invention is especially easy to fabricate with extruded aluminum sections, in which case the longitudinal members are also preferably formed as extruded aluminum sections.

To ensure a stable connection between the two cross members, it is recommended that they be secured by welding. However, with proper dimensioning and provision of sufficiently large supporting surfaces, glue adhesives may be used to bond the compound beam together, preferably with a positive interlocking connection. Alternatively, and depending on the design, the desired connection may also be made by screw, bolt and other like mechanical fasteners.

In modern vehicles, the rear end portion of the longitudinal bearers typically carry impact-absorption units on which the bumpers or bumper bearers are mounted. Since this region represents a connection point of the bearing structure which requires a stable design, the invention proposes to connect the ends of the lower cross member to these connection points or to the rear impact-absorption units to provide for a firm structure. Preferably, this joint should also be made by welding.

A favorable geometrical arrangement is realized if the lower cross member is situated approximately at the height of the bumper bearer so that the ends of the longitudinal bearers or impact-absorption units are positioned at the height of the lower cross member. Each end of the lower cross member is preferably welded in abutment with one of at the opposed inward facing side surfaces of the corresponding end portions of each longitudinal bearer such that the cross member bridges the ends of the longitudinal members.

In another embodiment of the invention, the length of the upper cross member extends a distance beyond the outward edge of the longitudinal bearers to facilitate the fabrication of a rear end having a substantial curving outer body side contour with suitable shaped contoured elements for the rear end.

In a specific embodiment of the invention, the lower cross member is formed as an L-shaped hollow section. In this way, it is easy to support the trunk floor on the lower, horizontal leg of the L-structure for connection thereto. The upper, vertical leg provides a suitable bearing surface for the upper cross member. The L-structure configuration provides for a lower cross member which exhibits high rigidity.

The upper cross member is preferably formed as a single extrusion comprising a first upper triangular hollow section and an adjoining second lower portion designed as a flat vertical plate having a horizontal ridge member at a bottom end thereof for connection to the lower cross member.

A sealing flange adapted for installation of a trunk seal or gasket member may be conveniently formed on the upper triangular hollow section, especially if it is formed as an extruded section.

In the preferred embodiment, the triangular hollow section of the upper cross member is projected in the rearward direction with respect to the vertical plate of the lower section such that a free space is created between the bumper and/or the upper edge of the bumper in the region of the vertically flat plate. The concave bulge of the bumper also surrounds the lower cross member with a free space. Thus, in the event of low energy rear impact, the bumper when deformed will not, in turn, deform the transverse compound beam, such that only the familiar impact absorption units operate in the free space and return the bumper to its original position after the impact.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows a portion of a rear end 1 of a vehicle body which includes a trunk floor 2 provided with a spare wheel recess 3. A pair of laterally spaced longitudinal members 4 (only one of which is shown) are disposed along opposing sides of the trunk floor 2. Each rearwardly disposed end of longitudinal members 4 includes an impact-absorption unit 5. The impact absorption units 5 are bridged together by a compound beam consisting of an upper cross member 6 and a lower cross member 7.

The upper and lower cross members 6, 7 are preferably formed as extruded aluminum sections. As is best seen in the cross section view of FIG. 2, the lower cross member 7 is formed as an L-shaped hollow section. The rear perimeter edge of the trunk floor 2 rest against a first horizontal leg 8 of the L-shaped cross section 7 while the upper, vertical leg 9 provides a bearing surface for supporting the upper cross member 6.

The upper cross member 6 includes an upper triangular hollow shape portion 10 and an adjoining lower flat plate portion 11. The lower flat plate portion 11 is provided with a horizontal leg 12 at its bottom end for connection to the vertical leg 9 of the lower cross member 7.

The preferred method for connection of the horizontal leg 2 to the vertical leg 9 is by welding, however it is understood that other known connection techniques may be used, including but not limited to connection by glue adhesives, or connection by rivets, screw fasteners and other like mechanical fastening means.

In the resulting compound beam, the contour of the upper cross member 6 follows the slight curvature of the lower supporting edge of the trunk-access door 13. In the upper region of the upper cross member 6 on a side facing the access door 13 a corresponding sealing flange 14 is preferably molded on the triangular hollow shape 10 and is provided with a trunk-access door seal 15. Rear body elements 16 are adjoined to the side ends of the upper cross member 6 in conventional fashion.

The lower cross member 7 lies beneath the level of the trunk floor 2 and its middle region follows the slight curvature of the upper cross member 6, where it is also firmly joined to the latter. The side ends 17, 18 of the lower cross member 7 are heavily curved forward and are connected in abutting fashion to the impact-absorption units 5 to form stable junction points.

The cross section view of FIG. 2 also illustrates the position and arrangement of a bumper 19 which comprises a bumper bearer 20 and a cover 21. The triangular hollow shape 10 of the upper cross member 6 projects to the rear relative to the adjoining lower, vertical plate portion 11. The upper edge 22 of the bumper 19 is disposed to lie both behind and underneath the triangular hollow shape 10 such that a free space is formed in the rear region adjacent the vertical plate 11. The concave bulge of the bumper 19 surrounds the lower cross member 7 at a distance sufficient to create a free space necessary for the safety operation of impact absorbers, whereby the bumper 19 is held in place by the impact-absorption units 5 via the rear body elements 16 in the known way.

The unique compound beam arrangement of the cross members 6 and 7 provides both a support for the trunk-access door (in upper cross member 6) and forms stable junction points which exhibit good force distribution characteristics in the region of the impact-absorption units. In the event of a rear impact of moderate severity, it is likely that only the upper cross beam 6 will suffer damage. Accordingly, both the damage and the repair cost of the present invention is less than that of familiar configurations.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

PARTS LIST

1. Rear End
2. Trunk Floor
3. Spare Wheel Recess
4. Lateral Longitudinal Member
5. Impact-Absorption Unit
6. Upper Cross Member
7. Lower Cross Member
8. Horizontal Leg Portion
9. Vertical Leg Portion
10. Upper Triangular Shape Portion
11. Lower Flat Plate Portion
12. Horizontal Leg
13. Trunk-Access Door
14. Sealing Flange
15. Seal
16. Rear Body Elements
17. Forwardly Curved Side End
18. Forwardly Curved Side End
19. Bumper
20. Bumper Bearer
21. Cover
22. Upper Edge

We claim:

1. In a vehicle body rear end which includes a pair of transversely spaced longitudinal bearers each having an impact-absorption unit disposed at a rearward end portion thereof, a trunk floor interposed between said longitudinal bearers and a trunk-access door, an improved rear end bearing structure comprising in operative combination:
    a) a lower cross member disposed beneath the level of the trunk floor having a middle region and opposed ends, each of said ends being forwardly curved and joined in abutment with a corresponding impact-absorption unit of said pair of longitudinal bearers;
    b) an upper cross member disposed on top of said lower cross member and having a middle region aligned with said middle region of said lower cross member and a pair of ends on which are supported outwardly disposed rear body elements, said upper cross member having a contour forming a lower supporting edge of the trunk-access door; and
    c) means for connecting said middle portions of said upper and lower cross members to form a compound beam.

2. A rear end in a vehicle body as in claim 1 wherein said upper and lower cross member are formed as extruded light metal sections.

3. A rear end in a vehicle body as in claim 1 wherein said connection means comprises a welded joint connection.

4. A rear end in a vehicle body as in claim 2 wherein said connection means comprises an adhesively bonded joint connection.

5. A rear end in a vehicle body as in claim 2 wherein said connection means comprises mechanical fasteners.

6. A rear end in a vehicle body as in claim 2 wherein:
    a) said lower cross member is formed as a hollow L-shaped profile in cross section including a lower, horizontal leg and an upper, vertical leg and wherein:
        i) said lower, horizontal leg supports at least a portion of said trunk floor; and
        ii) said upper, vertical leg supports said middle region of said upper cross member.

7. A rear end in a vehicle body as in claim 6 wherein said upper cross member comprises an upper triangular hollow portion in cross section and includes an adjoining lower vertically oriented flat plate portion, said flat plate portion having a transverse horizontal ridge disposed at a bottom edge thereof for connection to said lower cross member middle portion.

8. A rear end in a vehicle body as in claim 7 wherein said upper cross member includes a flange disposed along an upwardly and rearwardly facing surface of said upper triangular hollow portion, said flange adapted for carrying a sealing element for the trunk-access door.

9. A rear end in a vehicle body as in claim 8 wherein said triangular hollow portion of said upper cross member projects rearwardly with respect to said flat portion such that a free space is created by the surrounding enclosure of said lower cross member by a bumper assembly disposed rearwardly adjacent said upper cross member.

10. A rear end in a vehicle body as in claim 8 wherein said connection means comprises a welded joint connection.

11. A rear end in a vehicle body as in claim 8 wherein said connection means comprises an adhesively bonded joint connection.

12. A rear end in a vehicle body as in claim 8 wherein said connection means comprises mechanical fasteners.

13. A rear end in a vehicle body as in claim 9 wherein said connection means comprises a welded joint connection.

14. A rear end in a vehicle body as in claim 9 wherein said connection means comprises an adhesively bonded joint connection.

15. A rear end in a vehicle body as in claim 9 wherein said connection means comprises mechanical fasteners.

16. In a rear end of a light metal vehicle body including a pair of transversely spaced longitudinal bearers each having an impact-absorption unit disposed at a rearward end portion thereof, a trunk floor interposed between said longitudinal bearers and a trunk-access door, an improved rear end bearing structure comprising in operative combination:
   a) an extruded light metal lower cross member disposed beneath the level of the trunk floor having a middle region and opposed ends, each of said ends being forwardly curved and joined in abutment with a corresponding impact-absorption unit of said pair of longitudinal bearers;
   b) an extruded light metal upper cross member disposed on top of said lower cross member and having a middle region aligned with said middle region of said lower cross member and a pair of ends on which are supported outwardly disposed rear body elements, said upper cross member having a contour forming a lower supporting edge of the trunk-access door; and
   c) means for connecting said middle portions of said upper and lower cross members to form a compound beam.

17. A rear end in a vehicle body as in claim 16 wherein:
   a) said lower cross member is formed as a hollow L-shaped profile in cross section including a lower, horizontal leg and an upper, vertical leg and wherein:
      i) said lower, horizontal leg supports at least a portion of said trunk floor; and
      ii) said upper, vertical leg supports said middle region of said upper cross member.

18. A rear end in a vehicle body as in claim 17 wherein said upper cross member includes a flange disposed along an upwardly and rearwardly facing surface of said upper triangular hollow portion, said flange adapted for carrying a sealing element for the trunk-access door.

19. A rear end in a vehicle body as in claim 18 wherein said triangular hollow portion of said upper cross member projects rearwardly with respect to said flat portion such that a free space is created by the surrounding enclosure of said lower cross member by a bumper assembly disposed rearwardly adjacent said upper cross member.

20. A rear end in a vehicle body as in claim 19 wherein said connection means comprises a welded joint connection.

* * * * *